United States Patent [19]
Brax

[11] Patent Number: 5,335,225
[45] Date of Patent: Aug. 2, 1994

[54] COMMUNICATION SYSTEM AND A METHOD FOR CONTROLLING A CONNECTION IN THE COMMUNICATION SYSTEM

[75] Inventor: Veikko Brax, Ylivieska, Finland

[73] Assignee: Telenokia OY, Espoo, Finland

[21] Appl. No.: 910,325

[22] PCT Filed: Nov. 18, 1991

[86] PCT No.: PCT/FI91/00344
§ 371 Date: Sep. 18, 1992
§ 102(e) Date: Sep. 18, 1992

[87] PCT Pub. No.: WO92/09157
PCT Pub. Date: May 29, 1992

[30] Foreign Application Priority Data
Nov. 19, 1990 [FI] Finland .............................. 905698

[51] Int. Cl.[5] .......................... H04J 3/22; H04J 3/12; H04L 12/20; H04L 12/12
[52] U.S. Cl. .................................. 370/84; 370/110.1; 375/8
[58] Field of Search ..................... 370/60, 60.1, 84, 79, 370/94.1, 94.2, 110.1; 375/7, 8

[56] References Cited
U.S. PATENT DOCUMENTS

| | | | |
|---|---|---|---|
| 4,058,672 | 11/1977 | Crager et al. | 370/60 |
| 4,069,392 | 1/1978 | Goldenberg et al. | 370/84 |
| 5,124,976 | 6/1992 | Lemaistre et al. | 370/110.1 |
| 5,177,738 | 1/1993 | Dell'Oro et al. | 370/84 |

Primary Examiner—Wellington Chin
Attorney, Agent, or Firm—Cushman, Darby & Cushman

[57] ABSTRACT

A communication system in which terminal equipments capable of both voice and data service are interconnectable through a full-duplex connection or leg rate-adapted in compliance with CCITT V.110 or in the like manner and arranged to be attached V.24 interfaces, and to a method for controlling the connection. To enable the use of terminal equipments for both voice and data service in conjunction with such a rate-adapted leg, adapters provided at both ends of the leg utilize V.24 status signal states in the leg for hand-shaking end-to-end signalling events between the terminal equipment.

20 Claims, 5 Drawing Sheets

COMMUNICATION SYSTEM AND A METHOD FOR CONTROLLING A CONNECTION IN THE COMMUNICATION SYSTEM

BACKGROUND OF THE INVENTION

The invention relates to a communication system in which interconnection between terminal equipments capable for both voice and data service consist of at least one connection leg, which is rate-adapted in compliance with the CCITT recommendation V.110 or in a like manner and attached to V.24 interfaces, and to a method for controlling such a connection.

In a communication system of this type, the terminal equipments may comprise a data terminal adapted for a V.110 rate-adapted full-duplex connection by a terminal adapter, and a telephone handset which is, for instance, connected to a network termination or integrated in the data terminal for telephone conversation.

Examples of terminal equipments suitable for both data and voice service modes are the Telefax Group 3 terminal equipment and a personal computer telecommunication software which are adapted by a terminal adapter e.g. for an ISDN V.110 rate-adapted 64 kbit/s UDI bearer service or a GSM PLMN 9.6/4.8/2.4 kbit/s UDI bearer service. The terminal equipment may be full-duplex or half-duplex, and it comprises a standard or non-standard session protocol corresponding to the OSI layers 4 to 7 for the management and use of the voice/data service modes. The network termination equipment may thus be NT in ISDN or MT2 in GSM PLMN, for instance.

The terminal equipments of the Telefax Group 3 have not previously comprised a V.24 interface; instead, they have always utilized a modem interface and a 2-wire connection (modem connection through a telephone network, for instance). As the same transmission connection has thereby been able to transmit both voice and baseband modem signalling, the terminal equipments have been able to perform the transition from data service mode to voice service mode, for instance, in compliance with the applied management protocol of the services of the OSI layers 4 to 7 (e.g. CCITT T.30 or T.4) without any need to indicate the change of the service mode to the used transmission network or without any need for the transmission network to react to the change of service mode by somehow altering the configuration of the transmission connection.

Communication systems utilizing V.110 connections have the drawback that although the terminal equipments comprise a handset for telephone service, the V.110 rate-adapted transmission path is not able to transfer voice. However, the use of telephone service during a call is a normal function in the Telefax Group 3, for instance. Similarly, when receiving an incoming data call by a personal computer, it is necessary to answer the call by speech to enable the terminal user to start an appropriate application.

ISDN and GSM PLMN subscriber signallings will contain an In-Call Modification procedure, by which the speech connection can, if required, be changed into a V.110 rate-adapted data connection, and vice versa, an unlimited number of times by replacing the PCM coding with the UDI coding, and vice versa.

However, it has not been specified how the communication network could react to a service mode change performed within the OSI layers 4 to 7 between terminal equipments designed for modem connections, and as a result of it take the necessary steps to adapt the network for the new service mode e.g. by starting the In-Call Modification procedure to change a V.110 rate-adapted leg in the signal path into a speech connection.

Generally speaking, the problem is that an application utilizing a V.110 leg, such as a telefax service, and associated adapting means signal between each other functions which are significant for the call control (change of service mode, change of transmission rate, release of call). However, the call control is assigned to the network termination e.g. in the mobile telephone of the GSM system.

SUMMARY OF THE INVENTION

The object of the invention is to allow full utilization of integrated voice/data terminal equipments in communication systems deploying rate-adapted connection segments attached to V.24 interfaces.

The invention is based on the principle that the terminal equipment functions related to the OSI layers 4 to 7 are adapted by a terminal adapters or alternatively by terminal adapter and network adapter respectively in the terminal end and the network end for a V.24 status signal state to be transmitted within a frame over the rate adapted connection leg.

As already mentioned above, the transmission properties of the GSM system require reconfiguration of the traffic channel when the service mode (voice-data) or the transmission rate is changed, wherefore the GSM system comprises a terminal adapter and a network adapter which are specific for each service and which monitor the application signalling between the terminal equipments in order to be able to initiate the procedures required for the reconfiguration of the traffic channel.

In the invention, application parts forming part of the service are allowed to perform a hand-shaking of transactions significant for the call by means of V.24 status signal states from one end of the connection to the other. Such a hand-shaking procedure establishes a signalling connection between the above-mentioned adapters and enables procedures preventing the failure of the service due to the inappropriate mode of the rate-adapted connection segment. In the GSM system, for instance, there is thus three independent signalling protocols in effect: (1) GSM call control in compliance with the GSM standard 04.08 in a signalling channel Dm, (2) application protocol between the terminal equipments, such as the telefax application protocol T.30/T.4, and (3) hand-shaking between a terminal adapter and a network adapter associated with the service by means of V.25 status signal states.

Since the rate adaptation of the V.24 signal states to the V.110 frames is effected by the network termination, the network termination can easily also monitor the V.24 status signal states and initiate the call control procedures as required by the specified hand-shaking protocol e.g. on the signalling channel of the GSM system. One advantage of this arrangement is that the terminal adapter associated with the telefax service, for instance, can be realized independently by another manufacturer in such a way that the communication of the terminal adapter with the network termination is based on the fixed V.24 interface protocol instead of an equipment or software interface specific for the mobile telephone manufacturer.

The invention also allows the connection management to be automated as extensively as possible so that the reliability of the connection management functions can be increased (e.g. by ensuring that the connection shall always be released also from the direction of the subscriber equipment) and the use is facilitated in such a way that the user need not perform any additional procedures deviating from the normal operation of the terminal equipment for the configuration of the connection in cases where the connection comprises a rate adapted segment.

The network terminal may effect call control signalling, channel configuration and some other automatic adaptation in response to at least one predetermined V.24 status signal state.

The invention allows the attachment of a voice/data terminal equipment to a V.110 connection or other similar connection without that the subscriber signalling of the communication network needs to comprise any other special functions besides the normal In-Call modification procedure.

The invention increases the number of functions of the terminal adapter and the network adapter; however, it has the advantages of offering better support to the service functions and being based on standard signalling.

In the preferred embodiment of the invention connection adaptation means always carry out a hand-shaking procedure with each other by means of the V.24 status signal states through the rate-adapted leg after initial synchronization of the connection in conjunction with the set-up of the rate-adapted leg. As a result of this hand-shaking procedure, a predetermined first V.24 status signal state is provided for the connection segment, which status signal state is maintained unchanged throughout the data transmission in the data service mode.

The connection adaptation means monitor the communication between the terminal equipments, and on detecting the transmission of a disconnect message, they carry out a second hand-shaking procedure with each other by means of the V.24 status signal states through the leg, as a result of which a second predetermined V.24 status signal state causing the connection to be cleared is provided onto the leg.

Preferably, the connection adaptation means further monitor the communication between the terminal equipments, and on detecting the transmission of a request to change service mode, they carry out a third hand-shaking procedure with each other by means of the V.24 status signal states through the leg, as a result of which a third predetermined V.24 status signal state starting the In-Call Modification procedure is provided onto the leg. The leg is restored from the voice mode to the data mode by the In-Call Modification procedure started by manual intervention on the network termination, which is followed by the synchronization of the leg and said first hand-shaking procedure, as a result of which the leg reassumes said first V.24 status signal state.

Preferably the connection adaptation means further monitor the communication between the terminal equipments, and on detecting a request to change transmission rate, they perform a hand-shaking procedure by means of the V.24 status signal states, as a result of which the network adapter initiates a Channel-mode-modify procedure complying with the GSM standard 04.08 or the like procedure and the connection is caused to assume a fourth predetermined mode as an indication of the pending change of transmission rate. After the Channel-mode-modify procedure has been successfully completed in the network termination, the connection adaptation means perform a new hand-shaking procedure by means of which the V.24 status signal states are restored to the first predetermined mode so as to indicate that both terminal equipments are ready to continue the communication at the new channel rate. This procedure can speed up the change of transmission rate, which may be of importance in certain applications (e.g. telefax service).

BRIEF DESCRIPTION OF THE DRAWINGS

The invention will now be described in more detail by means of exemplifying embodiments with reference to the attached drawings, in which.

DETAILED DESCRIPTION

Figure 1A:
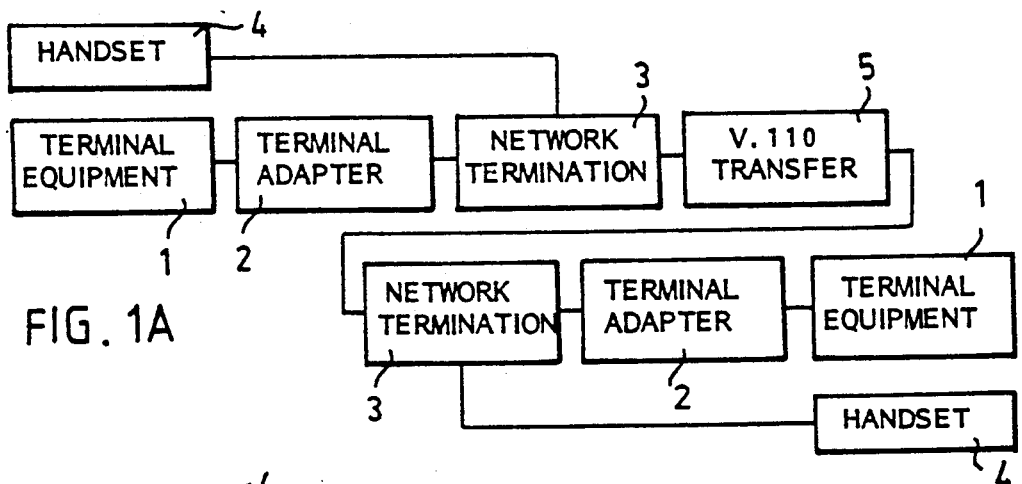
FIGS. 1A and 1B show communication systems according to the invention, in which terminal equipments are interconnected through a V.110 connection alone, and through a V.110 connection and a transit network, respectively.
Figure 1B:
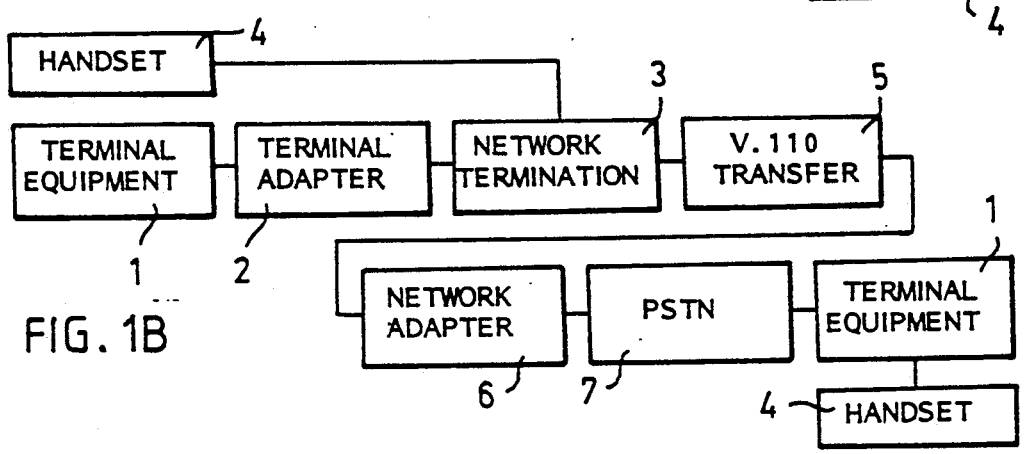

As shown in FIGS. 1A and 1B, the terminal equipments in the communication system according to the invention may comprise a data terminal 1 adapted to a V.24 interface by a terminal adapter 2, and further adapted for a V.110 rate-adapted full-duplex connection by network termination 3, and a telephone handset 4 connected to the network termination 3 or integrated in a data terminal 1 for telephone conversation. The V.110 connection described herein is originally a digital transmission channel developed for ISDN (Integrated Services Data Network) technology. It can be attached to a V.24 interface and it offers a possibility of transferring V.24 status signal states. The invention can, however, also be applied to other transmission channels which are similar to the V.110 channel and capable of transferring V.24 status signal states. An example of such transmission channels is the CCITT recommendation V.120, which is being developed.

The CCITT recommendation for a V.110 rate-adapted transmission channel is disclosed in CCITT Blue Book:V.110.

The CCITT recommendation for a V.24 interface is disclosed in CCITT Blue Book:V.24. As used here, a V.24 status signal state refers to a combination of the states of individual status signal (control) signals in the V.24 interface, such as CT105, CT106, CT107, CT108.2 and CT109. A multiple of such V.24 status signal states can be used for handshaking procedures.

Without restricting the general scope of the invention, only one example according to the invention of the use of the above-mentioned status signal states will be described. It is obvious to one skilled in the art that the object of the invention can also be realized in some other way by using the above-mentioned or some other status signals of the V.24 interface in such a way that the adaptation means in the opposite ends of the rate adapted leg are able to monitor the mode of each other and maintain the coordination necessary for the service. Furthermore, some of the status signals can be reserved for a local hand-shaking procedure in such a way, for instance, that a predetermined status signal state is set after the synchronization of the V.110 connection between the network termination and the terminal adapter. Such a local hand-shaking procedure limits the possibilities for the hand-shaking of status signal states over the network as some of the status signal states are not able to propagate transparently between the adaptation means.

It is also obvious to one skilled in the art that the hand-shaking procedures to be described in the text below can be modified extensively without deviating from the principle of the invention. In any case, the hand-shaking procedures have to be designed in such way that they are unambiguous, and a signalling mode forming part of one hand-shaking procedure must not inappropriately result in the initiation of another procedure. For instance, the connection releasing procedure has to be specified in such a way that it cannot result in status signal states which might be interpreted as a request for the change of service mode by the network terminal.

As shown in FIG. 1B, the terminal equipments may be interconnected solely through a V.110 rate-adapted network, that is, e.g. ISDN or GSM PLMN.

Alternatively, as shown in FIG. 1A, the terminal equipments may be interconnected through a transit network 7 (PSTN) in addition to the V.110 rate-adapted connection or a leg, in which case a network adapter 6 is provided between the V.110 connection and the transit network. There are several possibilities for transit networks, e.g.:

from GSM PLMN through PSTN to GSM PLMN with a modem as the network adapter 6,
from GSM PLMN to the terminal equipment of PSTN with a modem as the network adapter,
from ISDN through PSTN to ISDN with a modem as the network adapter 6,
from ISDN to the terminal equipment of PSTN with a modem as the network adapter 6,
from GSM PLMN through ISDN to GSM PLMN with mere synchronization and user data rate-adapting as the network adapter 6.

Terminal equipments suitable for both data and voice service mode include the Telefax Group 3 terminal equipment or the personal computer telecommunication software designed for V.24 interface, which is adapted by the network termination for an ISDN V.110 rate-adapted 64 kbit/s UDI bearer service or a GSM PLMN 9.6/4.8/2.4 kbit/s UDI bearer service. The terminal equipment may be full-duplex or half-duplex, and it comprises a standard or non-standard terminal session protocol corresponding to the OSI layers 4 to 7 for the management and use of the voice/data services. The network termination equipment is thus e.g. NT in ISDN or MT2 in GSM PLMN. Examples of such service procedures within the OSI layers 4 to 7 are the CCITT recommendations T.4 and T.30, which can be found in CCITT Blue Book:T.4 and CCITT Blue Book:T.30.

In the following the invention will be described by way of example by means of a communication in which the hand-shaking of the Telefax Group 3 terminal equipments in compliance with the CCITT recommendation T.30 is adapted for GSM PLMN by using PSTN as a transit network 7 and a modem-based network adapter 6.

Figure 2:
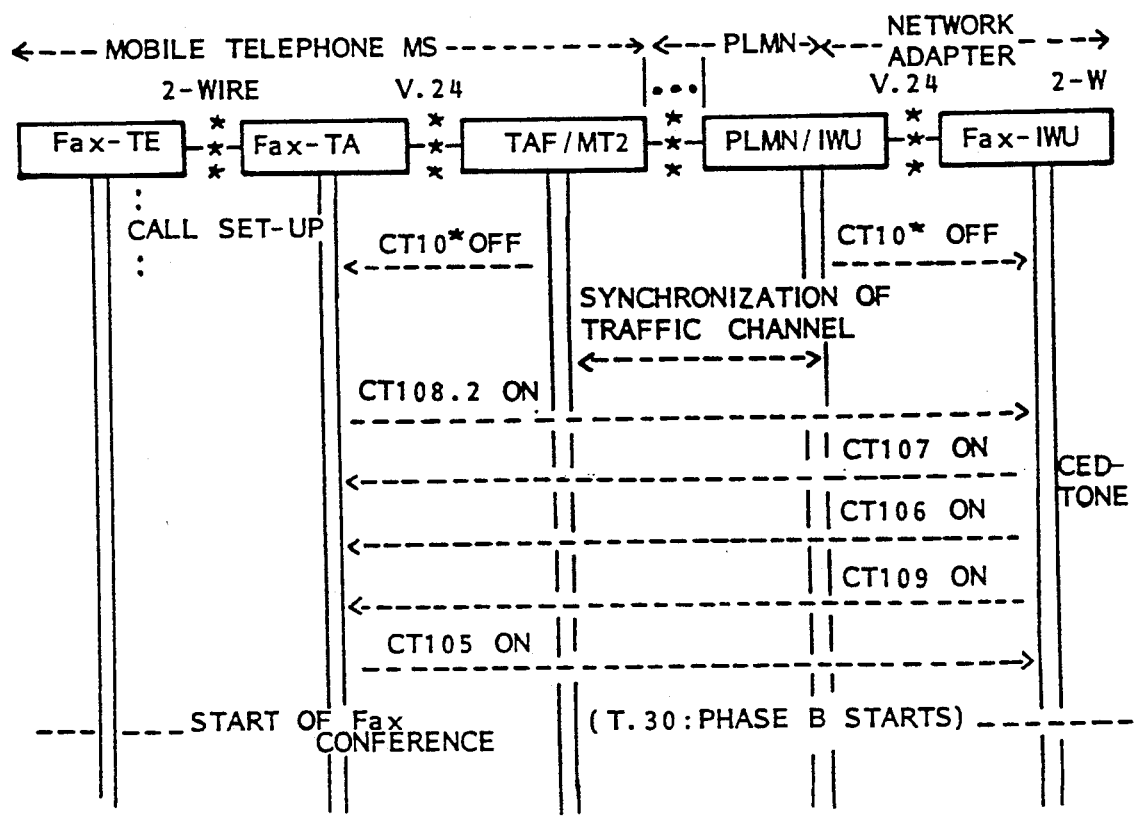
FIGS. 2 to 8 show signalling diagrams illustrating the starting of a terminal session, the terminating of the terminal session, and the change of the service mode and transmission rate of a V.110 connection in a GSM PLMN system (digital mobile radio system).

The subsystems of the GSM PLMN telefax service comprise a mobile radio unit (e.g. telephone) and a network adapter for the PSTN, as shown in FIG. 2. The mobile unit may comprise a telefax terminal (Fax-TE), a telefax terminal adapter (Fax-TA) and a network termination (TAF/MT2). The telefax terminal may be a conventional PSTN terminal equipment. The network termination may contain radio functions, signalling functions, mobility functions, and an adapter TAF offering a V.24 interface. The telefax terminal adapter may be an adapter complying with GSM 03.45. The network adapter for PSTN may comprise a transmission rate adapter (RA) and a telefax network adapter (Fax-IWU). Fax-TA and Fax-IWU are half-duplex in a direction towards a 2-wire connection and full-duplex towards GSM PLMN. The call control of the transparent telefax services of GSM PLMN is specified in the GSM recommendation 03.45. The terms used herein for the equipments and functions also mainly comply with the GSM standard.

In the GSM recommendation 03.45, the call control of the transparent telefax services of GSM PLMN specifies the adaptation of a half-duplex telefax service for a full-duplex PLMN connection in an inexact manner and fails to recite how the telefax terminal adaptation means and telefax<network adaptation means may need to coordinate their concerted action. This may lead to failures because of false assumptions of state and capability of the adaptation means connected to the other end of the rate adapted connection segment.

This is a recent problem because the terminal equipments of the Telefax Group 3 did not previously comprise a V.24 interface but they have always utilized a 2-wire interface.

The invention provides a solution to the above-mentioned problems by introducing the concept of hand shaking to allow terminal adaptation means and network adaptation means to remain adequately informed of the operational status of the other end.

By means of the invention, a conventional telefax terminal or GSM telefax device can be attached to a GSM PLMN connection without that the subscriber signalling (complying with GSM 04.08) needs to comprise any special telefax service functions.

The invention also allows the change of the service mode into telephone service and vice versa, which is an essential function of telefax service, in such a way that the functions of the telefax terminal are adapted for the normal In-Call Modification procedure of GSM PLMN.

The invention increases the number of functions of Fax-TA and Fax-IWU, but a major advantage is a better support for the features of the service functions.

The invention complements the standard call control of the transparent telefax services of ETSI/GSM at its different stages in the following way.

Starting a Terminal Session

The starting of a terminal session according to the invention is described in the following with reference to FIG. 2.

At first a connection is set up between the terminal equipments and in conjunction therewith the V.110 connection of GSM PLMN is synchronized in full compliance with the standard specified by ETSI/GSM.

After synchronization at least some of the V.24 status signals are transmitted transparently between the terminal adapter and the network adapter. In the following, it is assumed without restricting the general scope of the invention that the status signals CT106, CT107 and CT109 are transmitted from the network adapter to the terminal adapter. Correspondingly, it is assumed that the status signals CT105 and CT108.2 are transmitted from the terminal adapter to the network adapter.

A Mobile Unit Sets Up a Connection

After synchronization the network adapter Fax-IWU indicates that it has transmitted a calling tone (CNG) and received a called tone (CED) by transmitting the status signals CT109 OFFtoON and CT106 OFFtoON to the terminal adapter Fax-TA through the V.110 connection in a V.110 frame.

The terminal adapter Fax-TA acknowledges the status signals CT109 and CT106 by setting CT105 OFFtoON. When the state CT108.2 of the terminal equipment is additionally ON, a predetermined V.24 status signal state is provided onto the connection, which status signal state indicates to the terminal adapter and the network adapter that the terminal session has started and the terminal adapter Fax-TA and the network adapter Fax-IWU may initiate the hand-shaking of the carrier as specified in the GSM standard 03.45.

The terminal adapter and the network adapter keep the V.24 status signal state unchanged throughout the terminal session unless application signalling between the terminal equipments calls for performing other procedures significant for the rate adapted leg. To detect such application signals, the terminal adapter Fax-TA and the network adapter Fax-IWU monitor the communication between the terminal equipment in compliance with the GSM standard 03.45.

A PSTN Data Terminal Sets Up a Connection

After synchronization, the network adapter Fax-IWU indicates that it has received a calling tone (CNG) and initiated the transmission of a called tone (CED) by transmitting the status signals CT109 OFFtoON and CT106 OFFtoON to the terminal adapter Fax-TA through the V.110 connection in a V.110 frame.

The terminal adapter Fax-TA acknowledges the status signals CT109 and CT106 by setting CT105 OFFtoON. When the state CT108.2 of the terminal equipment is additionally ON, a predetermined V.24 status signal state is provided onto the connection, which status signal state indicates to the terminal adapter and the network adapter that the terminal session has started and the terminal adapter Fax-TA and the network adapter Fax-IWU may initiate the hand-shaking of the carrier as specified in the GSM standard 03.45.

The terminal adapter and the network adapter keep the V.24 status signal state unchanged through the terminal session unless application signalling between the terminal equipments calls for performing other procedures significant for the rate-adapted leg. To detect such application signals, the terminal adapter Fax-TA and the network adapter Fax-IWU monitor the communication between the terminal equipment in compliance with the GSM standard 03.45.

Call Clearing Procedure

In the following the clearing of a terminal session and the releasing of a connection will be described with reference to FIGS. 3 and 4. The terminal adapter Fax-TA and the network adapter Fax-IWU monitor the terminal session, and on detecting a disconnect request, they establish a predetermined V.24 status signal state, which may lead to the network termination to take action to automatically clear the call.

The Mobile Unit Ends the Session

Figure 3:
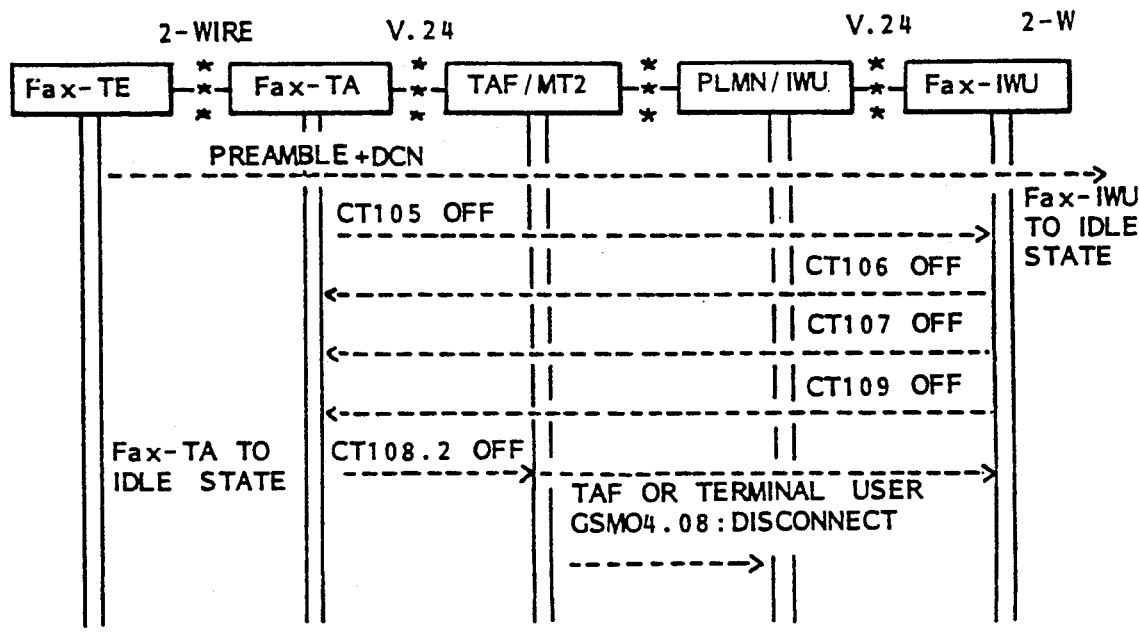

FIG. 3 shows how the mobile unit (Fax-TE) ends up the terminal session. The telefax terminal Fax-TE ends the terminal session by sending an disconnect message T.30:DCN, which is detected and forwarded by the terminal adapter Fax-TA monitoring the communication. The network adapter Fax-IWU also detects and forwards the disconnect message. FAX-TA transmits the V.24 status signals CT105 ONtoOFF and CT108.2 ONtoOFF. After having completed the transmission towards PSTN, Fax-IWU acknowledges by transmitting the V.24 status signals CT106 ONtoOFF, CT107 ONtoOFF and CT109 ONtoOFF. Both adapters assume an idle state. In response to such determined V.24 status signal state, the network termination TAF/MT2 is thereby able to generate the clearing of the call in a normal way if the terminal user has not initiated the clearing of the call from the user interface.

The PSTN Terminal Ends the Session

Figure 4:
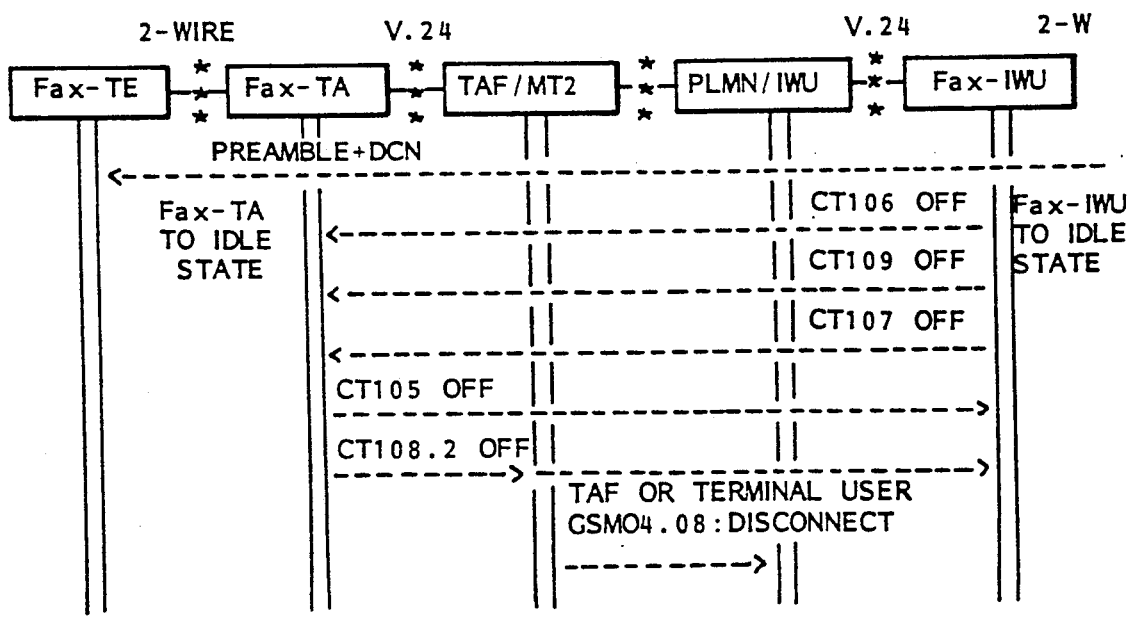

FIG. 4 shows how a terminal (not shown) connected to a public telephone network (PSTN) ends the terminal session (generally a case in which the disconnection message comes from the direction of the transmission network). The PSTN terminal ends the terminal session by transmitting the disconnection message T.30:DCN. The network adapter Fax-IWU detects and forwards the disconnection message and, and after disconnection, transmits the V.24 status signals CT106 ONtoOFF, CT107 ONtoOFF and CT109 ONtoOFF. The terminal adapter Fax-TA also detects the disconnection message, and acknowledges by the V.24 status signals CT105 ONtoOFF and CT108.2 ONtoOFF. The terminal adapter FAX-TA and the network adapter Fax-IWU assume an idle state. In response to such determined V.24 status signa state, the network termination TAF-MT2 is thereby able to generate the clearing of the call in a normal way if the terminal user has not initiated the clearing of the call from the user interface by an MMI command.

Change of the Type of Service Mode During a Call

Figure 5:
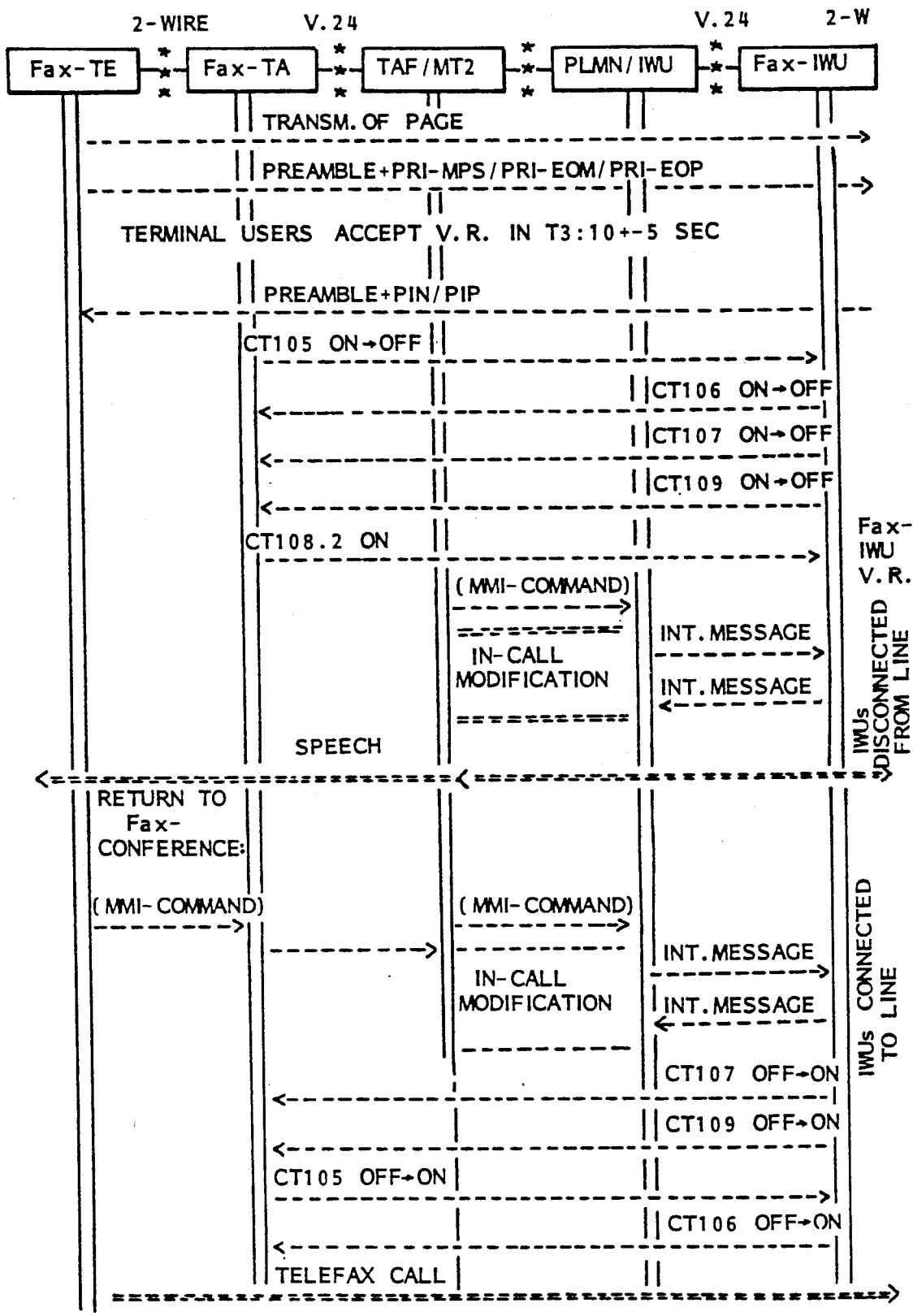
Figure 6:
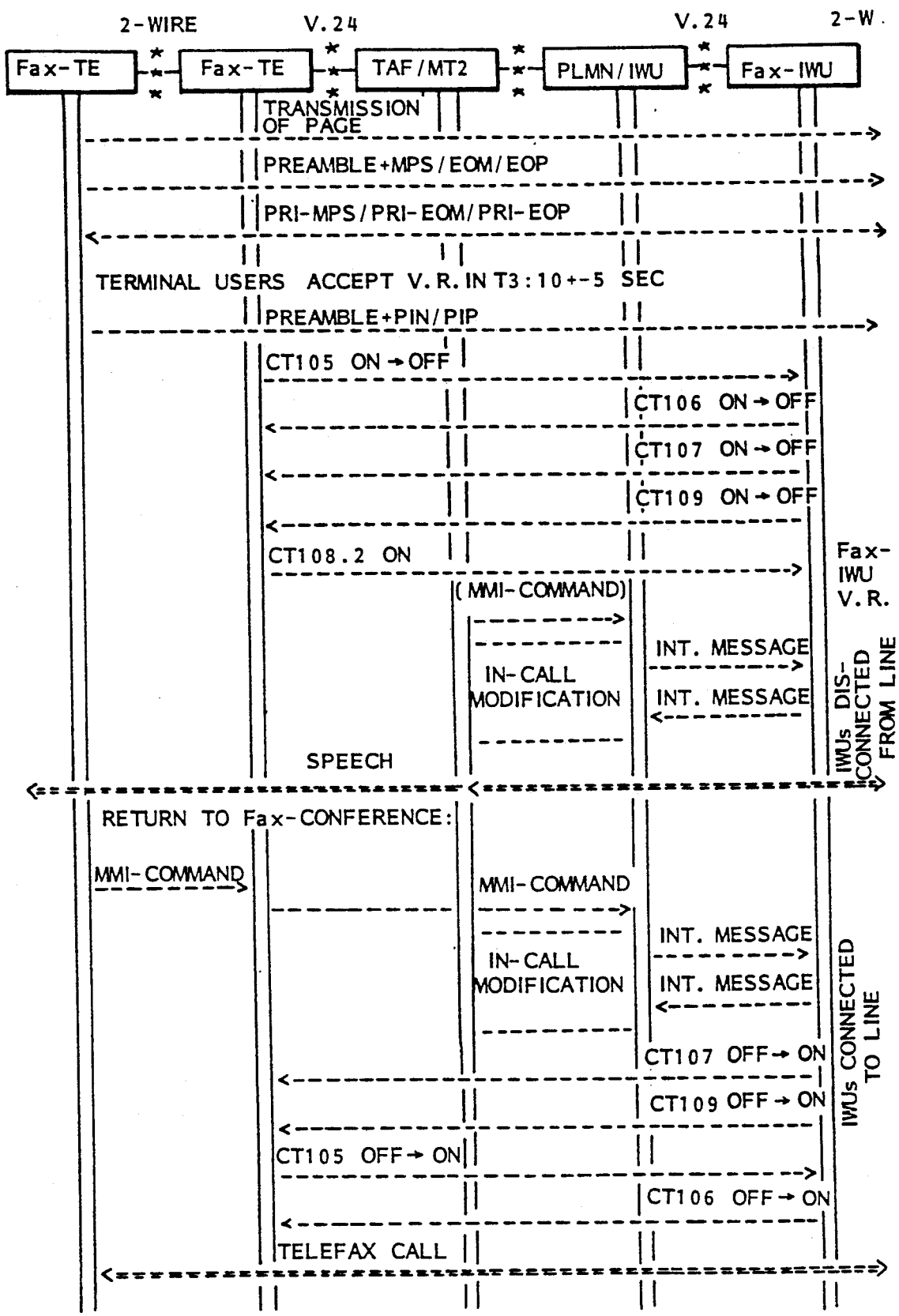

FIGS. 5 and 6 show the change of the type of service mode during a terminal session. T.30 specifies an optional Voice Request function, by means of which one of the terminal users is able to request the other to change over to telephone conversation and then return to the data service mode during the session by a hand-shaking procedure between the terminal equipments. The terminal adapter Fax-TA and the network adapter Fax-IWU monitor the terminal session, and on detecting a change of the type of service mode, they generate a V.24 status signal state for the PLMN connection in such a way that, if required, the network termination TAF is able to start the In-Call Modification procedure in a standard manner on the basis of this V.24 status signal state.

The Mobile Unit Requests for Change of Service

FIG. 5 illustrates the change of service requested by the mobile unit (Fax-TE). Fax-TE requests for the change of service (Voice Request) by transmitting PRI-Q in a normal way. The terminal users have 10±5 seconds time to initiate a speech connection. The terminal adapter Fax-TA monitors the hand-shaking procedure between the terminal equipments, and on detecting a service mode changing message, it forwards it. The network adapter Fax-IWU also detects the service mode changing message and after having forwarded it, it transmits the V.24 status signals CT107 ONtoOFF and CT109 ONtoOFF. The terminal adapter Fax-TA thereby generates the V.24 status signal CT105 ONtoOFF for the V.110 connection, and the network adapter Fax-IWU acknowledges by the V.24 status signal CT106 ONtoOFF, and both of them assume an idle state to wait for the restoration of the data mode. In addition, on detecting a service mode changing message, the terminal adapter Fax-TA keeps the V.24 status signal CT108.2 in the ON state, which is the opposite of the case when it detects the disconnection message. Without restricting the general scope of the invention, it is assumed in this example that the network termination TAF/MT2 reacts to the V.24 status signal state so generated by initiating a normal In-Call Modification procedure, if the terminal user has not already initiated it by the user interface. The In-Call Modification procedure also causes the network adapter Fax-IWU to be disconnected from the line.

When the terminal users want to return to the terminal session, one of them generates the In-Call Modification procedure by the user interface. The In-Call Modification procedure starts the synchronization of the V.110 connection and the reconnection of the network adapter Fax-IWU to the line. The network adapter Fax-IWU returns to the terminal session and acknowledges by means of CT107 OFFtoON and CT109 OFFtoON. The terminal adapter Fax-TA also returns to the terminal session and changes CT106 OFFtoON, which is acknowledged by the network adapter with CT106 OFFtoON.

The terminal adapter Fax-TA and the network adapter Fax-IWU now both know that they are both in the data state and ready for hand-shaking the carrier.

The PSTN Equipment Requests for Change of Service Mode

FIG. 6 illustrates a request for change of service made by a terminal equipment (not shown) connected to a public telephone network PSTN (generally a case in which the request for the change of service mode comes from the direction of the transmission network). When the PSTN terminal equipment requests for the change of service mode, the hand-shaking procedure is different for the network terminal and the terminal adapter, whereas it is similar as above for the V.24 status signal state.

In FIG. 6, a PSTN subscriber starts the Voice Request function by transmitting PIN/PIP in a normal way as an acknowledgement of an MPS/EOM/EOP message transmitted by MS. MS answers by transmitting a PRI-Q message. The terminal users have 10±5 seconds time to initiate a speech connection.

If MS is fully integrated, the MMI command of the Voice Request may directly start the In-Call Modification procedure.

If Fax-TA is a separate device, it detects PIN/PIP and PRI-Q transmitted as an acknowledgement of it. Fax-TA thereby keeps the V.24 status signal CT108.2 in the state ON and transmits the V.24 status signal CT105 ONtoOFF. Fax-IWU thereby assumes the Voice Request mode and acknowledges by the V.24 status signals CT106 ONtoOFF, CT107 ONtoOFF and CT109 ONtoOFF.

Without restricting the general scope of the invention, it is assumed in this example that the network termination TAF reacts to the V.24 status signal state so generated by initiating a normal In-Call Modification procedure. The In-Call Modification causes the IWU/Fax-IWU to be disconnected from the line.

Return to the telefax mode takes place similarly as in the case of FIG. 5.

Change of the Transmission Rate

Figure 7:
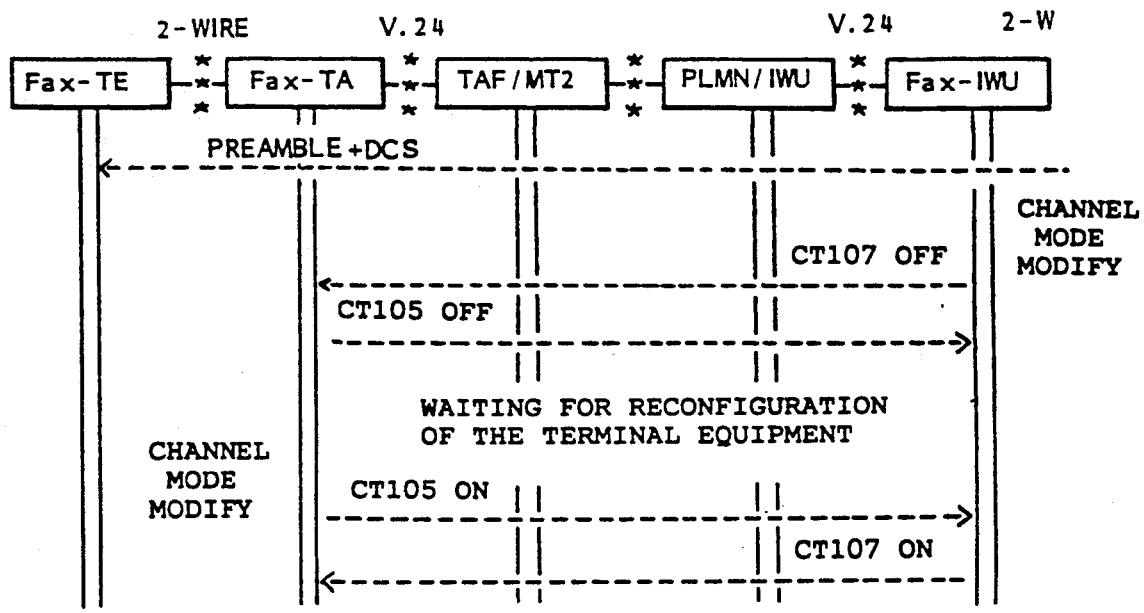
Figure 8:
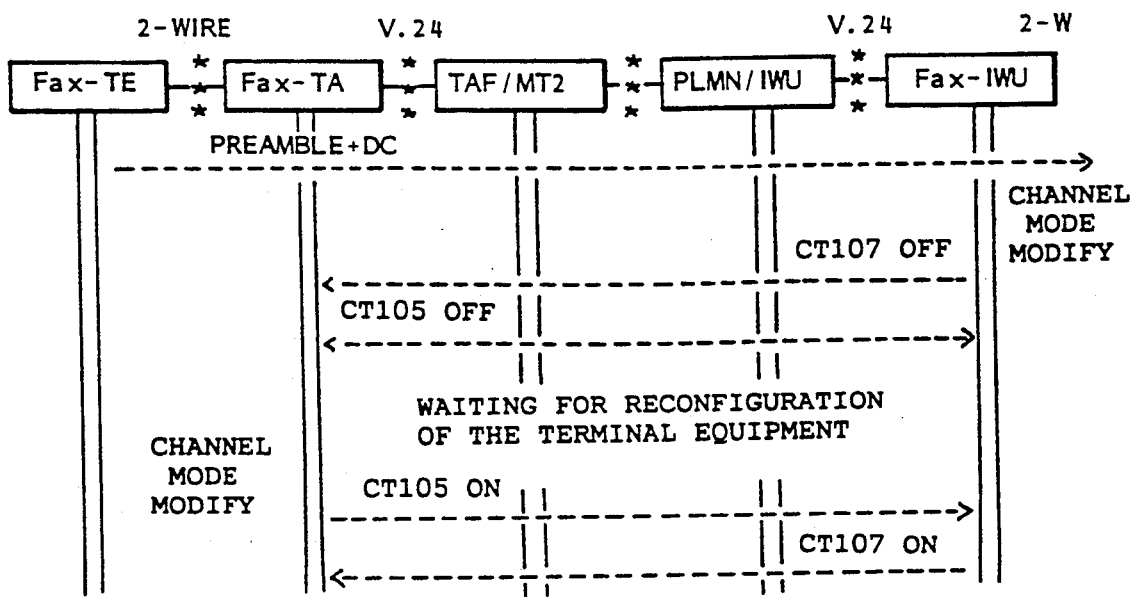

FIGS. 7 and 8 illustrate one possible function according to the invention in connection with the change of the transmission rate. In FIG. 7, the telefax terminal (not shown) on the PSTN side initiates the change of the page transmission rate. In FIG. 8, the change of the transmission rate is initiated by the telefax terminal equipment Fax-TE of the mobile telephone.

The terminal equipments possibly negotiate the transmission rate to be used with each other and possibly change it during the session e.g. in order to improve a detected inferior quality of the connection. In telefax services, for instance, the terminal equipments may negotiate and renegotiate the page transmission rate. The change of the transmission rate in such a way requires reconfiguration of the leg, for which purpose a Channel-mode-modify procedure is specified in GSM PLMN.

In GSM PLMN, transmission rate changes are performed solely by the mobile telephone exchange, and so the network adapter Fax-IWU controls the function. To detect the rate changing messages of the terminal equipments, the network adapter Fax-IWU monitors the communication between the terminal equipments.

On detecting a transmission rate changing message between the terminal equipments, the network adapter Fax-IWU sets the V.24 status signal CT105 ONtoOFF. The terminal adapter Fax-TA acknowledges by setting CT105 ONtoOFF. Thus a predetermined V.24 status signal state has been established indicating that both the terminal adapter FAX-TA and the network adapter FAX-IWU are prepared for the imminent change in the transmission rate.

The network adapter Fax-IWU starts the change of the rate of the channel through the signalling of the call control in compliance with the GSM standard 04.08. When the network termination TAF/MT2 receives a rate adaptation message from the call control of the mobile unit MS, it configures the V.110 rate adaptations and effects the terminal adapter to restore the V.24 status signal state to normal:CT105 OFFtoON. Such feedback from the network termination to the terminal adapter can be based on local V.24 status handshaking as mentioned above. The network adapter Fax-IWU detects CT105 status signal changes and acknowledges by changing CT107 OFFtoON. This indicates that both adapters have completed the reconfiguration of the V.110 connection and the channel can again be utilized by the terminal equipments. When the hand-shaking takes place by means of the V.24 status signal states between the adapters, the channel can be returned to use more rapidly than when waiting for the completion of the Channel-mode-modify procedure through the call control. This is important in synchronous applications, as such telefax service, in which there is no flow control available.

As a summary, it can be stated that the following features in particular are characteristic of the invention when applied to GSM PLMN:

Fax-TA and Fax-IWU generate a full-duplex V.24 status signal state for the PLMN connection at the connection set-up stage after the synchronization of the PLMN connection, Fax-TA and Fax-IWU generate a full-duplex V.24 status signal state for the PLMN connection after the Fax session in such a way that, if required, TAF is able to generate a connection release, Fax-TA and Fax-IWU generate a full-duplex V.24 status signal state for the PLMN connection after the Voice Request started during the session in such a way that Fax-TA and Fax-IWU assume the Voice Request mode to wait for the return to the telefax mode, and that, if required, TAF is able to generate the In-Call Modification procedure, Fax-TA and Fax-IWU generate a full-duplex V.24 status signal state for the PLMN connection after the In-Call Modification procedure in such a way that Fax-TA and Fax-IWU return after the Voice Request mode to the telefax mode as specified in CCITT:T.30, Fax-IWU and Fax-TA perform a hand-shaking procedure by means of a predetermined V.24 status signal state so as to indicate a transmission rate change to be made, Fax-TA and Fax-IWU perform a hand-shaking procedure after the reconfiguration of the transmission rate and subsequent synchronization of the V.110 connection by means of a normal full-duplex V.24 status signal state.

For the V.110 connection in general, the features particularly characteristic of the invention can be summarized as follows:

the terminal adapter and the network adapter generate a full-duplex V.24 status signal state for the V.110 connection at the connection set-up stage after the synchronization of the connection, the terminal adapter and the network adapter generate a predetermined full-duplex V.24 status signal state for the V.110 connection in response to the disconnect message, when the terminals interrupt the terminal session and change over to the voice service mode, the terminal adapter and the network adapter generate a full-duplex V.24 status signal state for the V.110 connection in such a way that the terminal adapter and the network adapter assume a stand-by mode to wait for the return to the terminal session, and that, if required, the terminal adapter is able to generate the In-Call Modification procedure, the terminal adapter and the network adapter generate a full-duplex V.24 status signal state for the V.110 connection after the In-Call Modification procedure in such a way that the terminal adapter and the network adapter return from the stand-by mode to the terminal session.

The description and the drawings are only intended to illustrate the present invention. In their details, the method and the data transmission system according to the invention may vary within the scope of the accompanying claims.

I claim:

1. A method for controlling a connection between terminal equipments in a communication system in which the connection includes at least one leg attached to V.24 interfaces and rate-adapted in compliance with the CCITT recommendation V.110 or an equivalent comprising:

utilizing V.24 status signal states in said at least one leg for hand-shaking end-to-end signalling events between the terminal equipments which are significant to said at least one leg.

2. The method according to claim 1, further including:

determining the V.24 status signal states of said leg by utilizing said end-to-end signalling events.

3. The method according to claim 1, wherein:

said end-to-end signalling events between the terminal equipments significant to the leg correspond to procedures of at least one of OSI layers 4 to 7.

4. A method according to claim 1, comprising:

monitoring messages transmitted by said terminal equipments in accordance with OSI layers 4 to 7; and generating a corresponding one of said V.24 status signal states for said at least one leg when a message significant to said at least one leg is detected as a result of said monitoring.

5. The method according to claim 1, comprising:

providing adapters at both ends of said at least one leg for adapting terminal equipment signals for said at least one leg; and operating said adapters to always carry out a first hand-shaking procedure by means of said V.24 status signal states after an initial synchronization of said at least one leg, said first hand-shaking procedure generating a first predetermined one of said V.24 status signal states for said leg, which first status signal state is maintained unchanged throughout a data mode of the connection.

6. The method according to claim 5, comprising:

restoring said at least one leg from a voice mode to a data mode by an In-Call-Modification procedure started by one of said terminal equipments, and thereafter resynchronizing said at least one leg and generating said one of said V.24 status signal states for said at least one leg utilizing said first hand-shaking procedure.

7. The method according to claim 1, comprising:

providing adapters at both ends of said at least one leg for adapting terminal equipment signals for said at least one leg; and operating said adapter to monitor the communication between said terminal equipments, and when said adapters detect transmission of a disconnect message, operating said adapters to carry out a hand-shaking procedure utilizing said V.24 status signal states, said hand-shaking procedure generating a predetermined one of said V.24 status signal states for said at least one leg, which status signal state results in a release of said connection.

8. The method according to claim 1, comprising:

providing adapters at both ends of said at least one leg for adapting terminal equipment signals for said at least one leg; operating said adapters to monitor the communication between the terminal equipments; and when said adapters detect a request for changing service mode, said adapters carrying out a hand-shaking procedure utilizing said V.24 status signal states, said hand-shaking procedure generating a predetermined one of said V.24 status signal states for said at least one leg, which status signal state results in a standard In-Call-Modification procedure.

9. The method according to claim 1, comprising:

providing adapters at both ends of said at least one leg for adapting terminal equipment signals for said at least one leg;

operating said adapters to monitor communication between said terminal equipments; and upon thereby detecting a message indicating a change in transmission rate between said terminal equipments, causing said terminal equipments to carry out a hand-shaking procedure with each other utilizing said V.24 status signal states, said hand-shaking procedure generating a predetermined one of said V.24 status signal states for said at least one leg, which status signal state results in carrying out a standard Channel-mode-modify procedure.

10. The method according to claim 9, comprising:

after changing of the transmission rate of said at least one leg initiated by said V.24 status signal state has been completed, said adapters carrying out another hand-shaking procedure utilizing said V.24 status signal states, said other hand-shaking procedure generating another one of said V.24 status signal states, which other status signal state causes said at least one leg be returned to useability by said terminal equipments.

11. A communication system capable of establishing a connection between terminal equipments, comprising:

at least one leg having two ends attached to V.24 interfaces and rate-adapter in compliance with the CCITT recommendation V.110 or an equivalent;

adaptation means provided at both ends of said leg for adapting terminal equipment signals for said at least one leg, said connection adaptation means being structured for utilizing V.24 status signal states in said at least one leg for hand-shaking end-to-end signalling events between said terminal equipments which are significant to said at least one leg.

12. The system according to claim 11, wherein:

said adaptation means are structured to monitor communication between said terminal equipments for detecting said end-to-end signalling events between said terminal equipments significant to said at least one leg and to utilize said V.24 status signal states for hand-shaking at least one of said end-to-end signalling events.

13. The communication system according to claim 12, wherein:

said adaptation means comprise means for carrying out a first predetermined hand-shaking procedure by means of said V.24 status signal states for generating a first one of said V.24 status signal states for said at least one leg in response to an initial synchronization of said at least one leg.

14. The communication system according to claim 13, wherein:

said adaptation means are structured to carry out, in response to detecting of a request to change service mode in the communication between the terminal equipments, a second predetermined hand-shaking procedure by means of said V.24 status signal states for generating a second one of said V.24 status signal states for said at least one leg.

15. A system according to claim 14, wherein:

said adaptation means are structure to carry out a third predetermined hand-shaking procedure by means of said V.24 status signal states for generating a third one of said V.24 status signal states for said at least one leg in response to detection of a disconnection message in the communication between said terminal equipments.

16. The communication system according to claim 13, wherein:

said adaptation means are structured to carry out in a voice mode said hand-shaking procedure by means of said V.24 status signal states for generating said first one of said V.24 status signal states for said at least one leg in response to an In-Call-Modification procedure started by one of said terminal equipments.

17. The communication system according to 12, wherein:

one of said adaptation means comprises a terminal adapter means; and wherein a network termination means is associated with said terminal adapter means for providing rate-adaptation and signalling functions;

a connection being set up between said terminal equipments via said terminal adapter means and network termination means such that said at least one leg is rate-adapted by said network termination means;

said network termination means being structured for monitoring said V.24 status signal states in said at least one leg and effecting call control signalling, channel configuration or other automatic adaptation in response to at least one of said V.24 status signal states.

18. The communication system according to claim 17 wherein:

said network termination means being structured to effect, in response to the detection of said second status signal state in said rate-adapted leg, a call control signalling for an In-Call-Modification procedure.

19. A communication system according to claim 17, wherein:

said network termination means being structured to effect, in response to the detection of said third status signal state in said rate-adapted leg, a call control signalling for a call clearing procedure.

20. A communication system according to claim 11, wherein:

said terminal equipments are telefax devices structured for exchanging therebetween messages complying with CCITT T.4 or T.30 and according to at least one of OSI layers 4, 5, 6 and 7.

* * * * *